(12) United States Patent
Yedid Am et al.

(10) Patent No.: US 10,902,642 B2
(45) Date of Patent: Jan. 26, 2021

(54) ALIGNMENT OF IMAGES OF A CALIBRATION IMAGE USING A PATTERN

(71) Applicant: HP Indigo B.V., Amstelveen (NL)

(72) Inventors: Tsafrir Yedid Am, Ness Ziona (IL); Eli Kaminsky, Ness Ziona (IL); Moshe Haim, Ness Ziona (IL)

(73) Assignee: HP Indigo B.V., Amstelveen (NL)

( * ) Notice: Subject to any disclaimer, the term of this patent is extended or adjusted under 35 U.S.C. 154(b) by 0 days.

(21) Appl. No.: 16/343,815

(22) PCT Filed: Oct. 28, 2016

(86) PCT No.: PCT/EP2016/076129
§ 371 (c)(1),
(2) Date: Apr. 22, 2019

(87) PCT Pub. No.: WO2018/077431
PCT Pub. Date: May 3, 2018

(65) Prior Publication Data
US 2019/0266754 A1    Aug. 29, 2019

(51) Int. Cl.
*G06K 5/04* (2006.01)
*G06T 7/80* (2017.01)
*H04N 1/60* (2006.01)
*H04N 1/387* (2006.01)
*H04N 1/407* (2006.01)

(52) U.S. Cl.
CPC ............... *G06T 7/80* (2017.01); *G06T 7/85* (2017.01); *H04N 1/387* (2013.01);
(Continued)

(58) Field of Classification Search
CPC .. H04N 1/387; H04N 1/58; H04N 2201/0448; G06T 7/80
(Continued)

(56) References Cited

U.S. PATENT DOCUMENTS 7,271,822 B2    9/2007 Towner
8,072,644 B2    12/2011 Saquib et al.
(Continued)

FOREIGN PATENT DOCUMENTS

EP    3216005 A1 *    9/2017 ............... G06T 7/80
EP    3216005 B1 *    11/2019 ............... G06T 7/85
(Continued)

OTHER PUBLICATIONS

Li, Bo et al. "A Multiple-Camera System Calibration Toolbox Using a Feature Descriptor-Based Calibration Pattern", 2013 IEEEE/RSJ International Conference on Intelligent Robots and Systems, IEEE, Nov. 3, 2013 (Nov. 3, 2013), pp. 1301-1307.
(Continued)

*Primary Examiner* — Jamares Q Washington
(74) *Attorney, Agent, or Firm* — HP Inc. Patent Department

(57) ABSTRACT

In an example, two images of a printed calibration image are acquired using two measurement devices. The measurement devices are offset along an axis so that the two images correspond to two portions of the printed calibration image overlapping along the axis. The printed calibration image comprises a pattern extending across the printed calibration image in the direction of the axis, the pattern defining a shape so that in each image, a portion of the pattern appears as different from a straight line parallel to the axis. The two images are aligned using the two portions of pattern.

11 Claims, 2 Drawing Sheets

(52) U.S. Cl.
CPC .......... *H04N 1/4076* (2013.01); *H04N 1/603* (2013.01); *G06T 2207/10008* (2013.01); *G06T 2207/10012* (2013.01); *G06T 2207/10024* (2013.01); *G06T 2207/30176* (2013.01); *G06T 2207/30204* (2013.01)

(58) Field of Classification Search
USPC ................. 358/1.18, 518, 504, 540; 399/294
See application file for complete search history.

(56) References Cited

U.S. PATENT DOCUMENTS

| | | |
|---|---|---|
| 8,842,331 B1 | 9/2014 | Enge |
| 2011/0012949 A1 | 1/2011 | Enge et al. |
| 2014/0285822 A1* | 9/2014 | Regelsberger ......... B41J 2/2146 358/1.2 |

FOREIGN PATENT DOCUMENTS

| | | |
|---|---|---|
| WO | WO-2007039444 | 4/2007 |
| WO | WO-2009115855 | 9/2009 |
| WO | WO-2011054815 | 5/2011 |
| WO | WO-2016141984 | 9/2016 |

OTHER PUBLICATIONS

Lu, Y. et al., Photometric Calibration and Image Stitching for a Large Field of View Multi-camera System Apr. 11, 2016, < http://www.ncbi.nlm.nih.gov/pmc/articles/PMC4851030/ >.

* cited by examiner

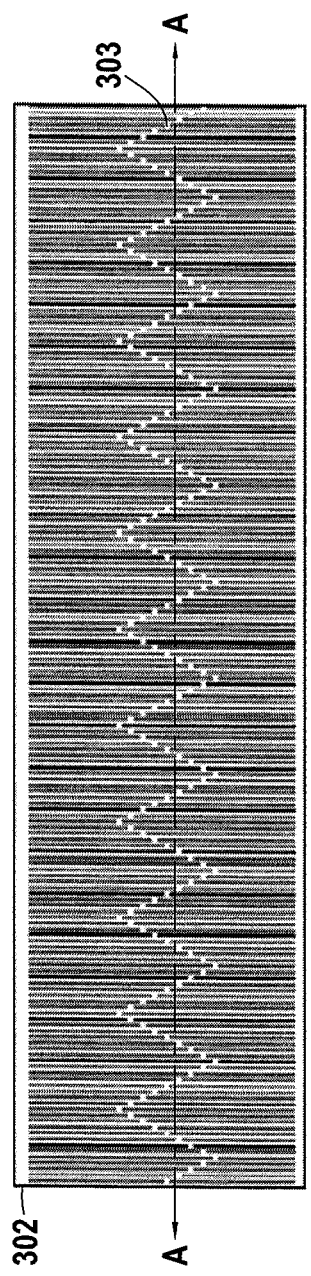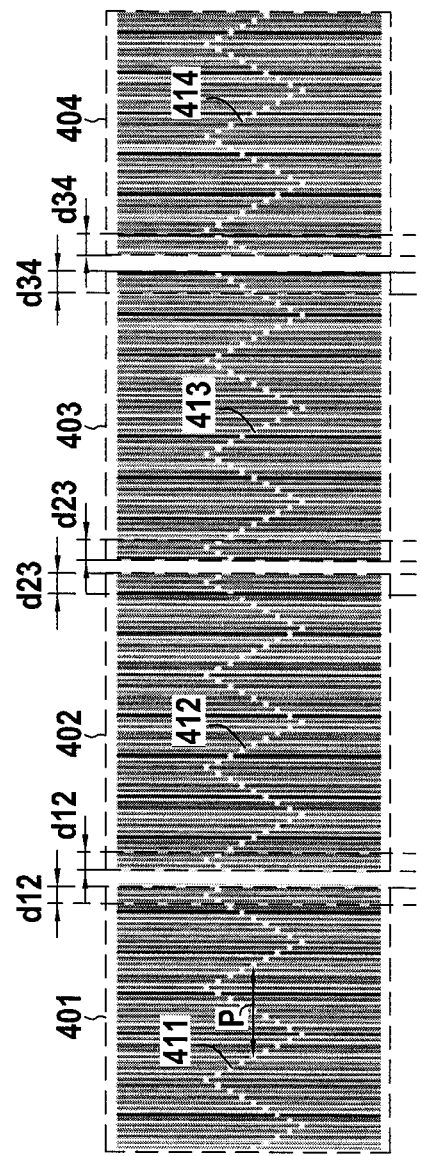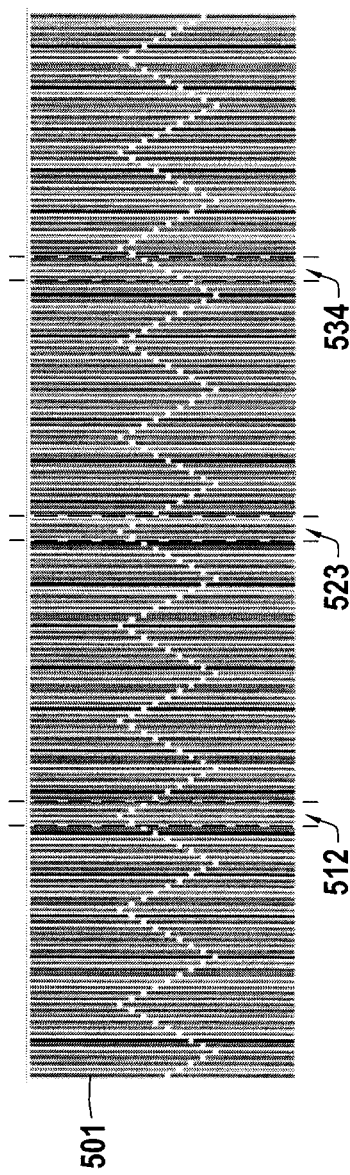

ALIGNMENT OF IMAGES OF A CALIBRATION IMAGE USING A PATTERN

BACKGROUND

Some printers can be calibrated, for example to control the color output of a printer, or its spatial stability, or the quality of its output. This allows obtaining more consistent outputs. Calibration may be done by scanning a printed calibration image.

Some printers print in wide formats and use a plurality of scanners for calibration. The outputs of each scanner have to be processed to allow calibration.

BRIEF DESCRIPTION OF THE DRAWINGS

The following detailed description references the drawings, wherein:

FIG. 3 is an illustration of example of calibration images with a pattern;

FIG. 4 is an illustration of scanned images; and

FIG. 5 is an illustration of aligned images.

DETAILED DESCRIPTION

Figure 1:
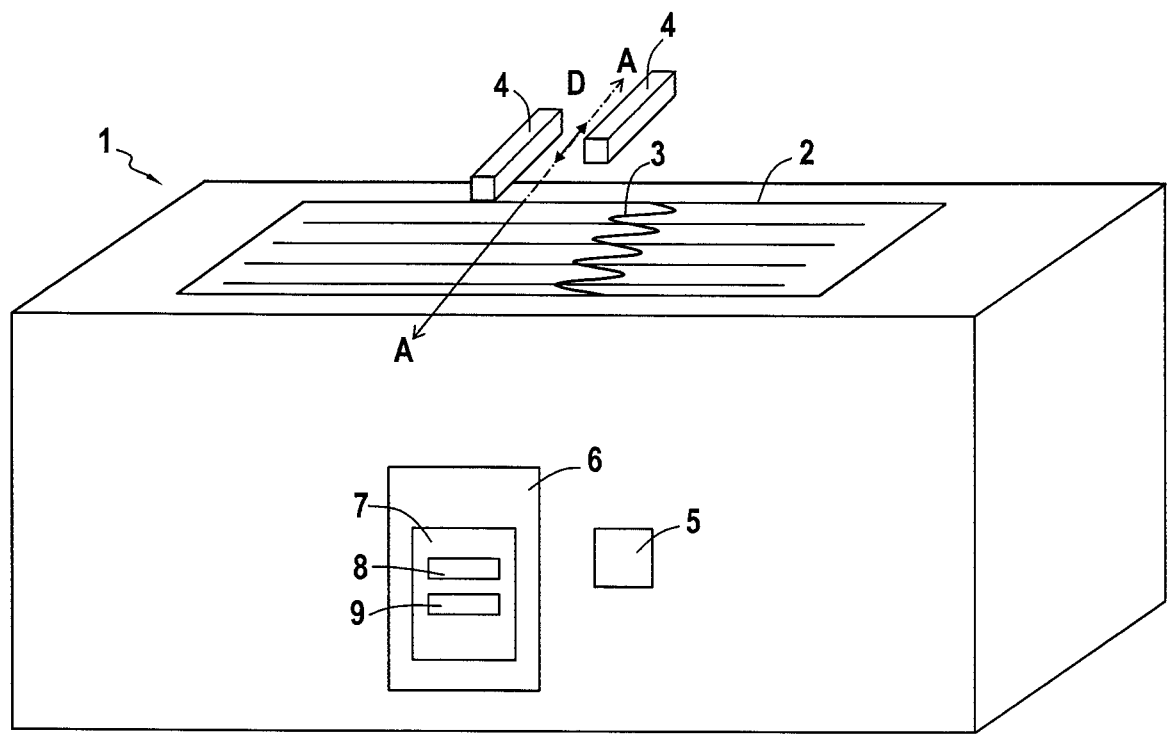
FIG. 1 is a simplified schematic of an example printer.

The following detailed description refers to the accompanying drawings. Wherever possible, the same reference numbers are used in the drawings and the following description to refer to the same or similar parts. While several examples are described in this document, modifications, adaptations, and other implementations are possible. Accordingly, the following detailed description does not limit the disclosed examples. Instead, the proper scope of the disclosed examples may be defined by the appended claims.

In a printer, various measurement devices or scanners may be used during the calibration. In printers, or in presses, which print on very wide sheet (for example more than 75 cm), a plurality of measurement devices may be used to calibrate the printers or presses.

A technical challenge arises in the aligning, or stitching of the images produced by the measurement devices, because aligning may require the use of stitching elements which occupy a large area which may therefore not be used for the calibration strictly speaking.

Improved aligning may be achieved according to the present disclosure because aligning is performed using a portions of a pattern which appears on each image acquired by the scanners, On FIG. 1, an example printer 1 is shown. The printer 1 may be any appropriate printing device that performs an imaging operation, for example by printing fluid with color. The printer is able to print calibration images on media (such as paper). A printed image 2 has been represented on FIG. 1. The printed calibration image 2 is, in this example, an image used for Solid Uniformity Calibration (used for controlling the consistency of colors). However, the present disclosure applies to various calibration methods, for example Half Tone Uniformity Calibration, Scan Band Calibration, etc. For example, the present disclosure applies to calibration methods which use a plurality of measurement devices.

In the present example, the printed calibration image 2 comprises a plurality of stripes which are, during the printing and the scanning, perpendicular to an axis A-A of the printer. This axis is substantially perpendicular to the direction of the media in the printer.

The printed calibration image 2 comprises a pattern 3 extending across the printed image and in the direction of the axis A-A. In this example, the pattern 3 is a periodical pattern having a sinusoidal shape.

In order to perform calibration, the printer 1 comprises two measurement devices 4 which are offset to allow an overlap along the axis A-A by a distance D. The two images produced by the measurement devices 4 are overlapping along the axis by the distance D. For example the measurement devices 4 may be In-line Scanners, In-Line Cameras, or Spectrophotometers. The printer 1 further comprises a processor 5 and a storage 6 comprising a set of instructions 7. The storage 6 may include any electronic, magnetic, optical, or other physical storage device that stores executable instructions and data. Thus, storage 6 may be, for example, Random Access Memory (RAM), Electrically-Erasable Programmable Read-Only Memory (EEPROM), a storage drive, an optical disc, and the like.

It should be noted that more than two measurement devices may be used by the printer 1.

The set of instructions 7 comprises an instruction 8 to acquire two images of a printed calibration image using the two measurement devices 4, and an instruction 9 to align the two images using the two portions of pattern 3.

Using the two measurement devices 4, two images may be obtained which will each comprise a portion of the printed image and a portion of the pattern.

Because the pattern is sinusoidal, by cancelling the phase between the two portions of pattern, it is possible to align the images to obtain a scanned image of the entire printed image 2. In each image acquired by the measurement devices 4, a portion of a sinusoidal signal appears and this allows the aligning.

Also, in this example, the spatial period of the pattern is chosen to be greater than the length D of the overlapping between the two measurement devices. This allows obtaining a monovalent alignment when the phase is cancelled.

Figure 2:
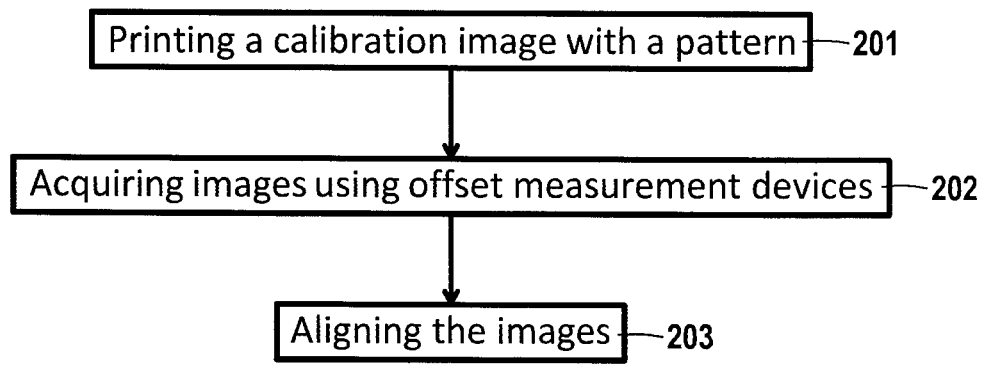
FIG. 2 is flowchart of an example of a method for aligning scanned images.

FIG. 2 is a flowchart of a method for aligning images which correspond to portions of a printed calibration pattern. This method may be performed, for example, by a printer such as the one described in reference to FIG. 1.

Firstly, a calibration image is printed 201 with a pattern having the following properties. The pattern may extend across the printed calibration image in the direction of an axis substantially perpendicular to the direction of the paper through the printer, the axis being also the direction in which a plurality of measurement devices of the printer offset.

Prior to the printing, the pattern may be superimposed on the calibration image if the calibration image does not comprise the pattern.

Then, the offset measurement devices acquire 202 a plurality of images of the printed calibration image. Each image corresponds to a portion of the printed calibration image and because of the offset, a sub-portion of the image is also in another image obtained by another measurement device. Also in each image, a portion of the pattern is present and this portion may differ from a line parallel to the axis in the image. The shape of the pattern may be chosen to achieve this.

For example, the pattern may have a periodical shape. It may also be a straight line with an angle with respect to the axis. The pattern may be a line (periodical, curved, or angled) having a small thickness (for example the smallest resolution of the printer, or the smallest resolution detected by the measurement devices). The pattern may comprise white dots forming a line (or dots of the color of the media in which no fluid is deposited). Using a thin pattern such as a line (periodical, curved, or angled) which crosses the printed image allows losing few information. For example, in a Solid Uniformity Calibration image, colored stripes are printed in a direction perpendicular to the axis, and a thin pattern will only cost a loss of information corresponding to the thickness of the line (or of the dots forming the line).

The images are aligned 203, using the portions of pattern. If the pattern is periodical, then the phase may be cancelled between the portions of pattern. If the pattern has other shapes, then having knowledge of the initial shape may allow aligning the images.

FIG. 3 shows an example of a printed calibration image 302, here a Solid Uniformity Calibration image, comprising a plurality of stripes which are perpendicular to the axis A-A described in reference to FIG. 1.

This printed calibration image 302 comprises a periodical pattern 303 formed by white dots. In this example, the periodical pattern has a triangular shape, and it extends across the printed calibration image 302 in the direction of the axis A-A.

FIG. 4 shows four images 401, 402, 403, and 404, acquired using four measurement devices (for examples four scanners of a printer). Each image 401, 402, 403, or 404 corresponds to a portion of the printed calibration image 302 described on FIG. 3. The four measurement devices used for this example are each offset so that each image 401, 402, 403, or 404 overlaps with another image or with two images (for example for images 402 and 403).

The images 401, 402, 403, and 404 each comprise a portion of the pattern 303 of FIG. 3. More precisely, image 401 comprises a portion 411 of the pattern, image 402 comprises a portion 412 of the pattern, image 403 comprises a portion 413 of the pattern, and image 404 comprises a portion 414 of the pattern. On the right of image 401, part of the portion 411 of the pattern corresponds to a part of the portion 412 of the pattern of image 402. This part of the portion has a length which corresponds to the overlapping between the measurement devices and which is denoted d12. In this example, the three dots of the pattern 411 on the right correspond to the three dots of the pattern 412 on the left. Thus, it is possible to align images 401 and 402.

Similarly, it is possible to align image 402 and image 403, and it is possible to align image 403 with image 404. The length of the overlapping between the measurement devices of images 402 and 403 is denoted d23. The length of the overlapping between the measurement devices of images 403 and 404 is denoted d34.

The three alignments may be performed to cancel the phase between the portions of patterns, for example by displacing the images to obtain a matching overlap. Also, the spatial period P of the pattern is chosen in this example to be greater than the overlaps between the measurement devices d12, d23, and d34. This facilitates the aligning because cancelling the phase only leads to a single possible aligning.

FIG. 5 shows the image 501 obtained after aligning the images 401 to 404 of FIG. 4. The aligned image may also be called a stitched image.

Also, on this figure, the overlapped portions of the final images, obtained by overlapping images 401, 402, and 403, are denoted 512, 523, and 534.

It should be noted that in the above examples, aligning of images is obtained using a small area of the printed calibration images. In the above examples, there is a minimal loss of information used for calibration in the direction perpendicular to the axis.

The invention claimed is:

1. A method comprising:
   acquiring two images of a printed calibration image using two measurement devices, the measurement devices offset along an axis so that the two images correspond to two portions of the printed calibration image overlapping along the axis,
   the printed calibration image comprising a periodical pattern extending across the printed calibration image in the direction of the axis,
   the pattern defining a shape so that in each image, a portion of the pattern appears as different from a straight line parallel to the axis,
   and
   aligning the two images using the two portions of pattern, wherein the aligning includes cancelling the phase between the two portions of pattern.

2. The method of claim 1, comprising acquiring n images using n measurement devices, with n>2.

3. The method of claim 1, wherein the measurement devices are scanners or in-line cameras or spectrophotometers.

4. The method of claim 1, wherein the spatial period of the pattern is chosen to be greater than the length of the overlapping between the two measurement devices.

5. The method of claim 1, wherein the pattern comprises a plurality of white dots.

6. The method of claim 1, wherein the pattern is a color calibration pattern comprising a plurality of stripes perpendicular to the axis.

7. The method of claim 5, wherein the pattern comprises a plurality of white dots and each stripe comprises a white dot of the plurality of white dots.

8. The method of claim 1, comprising printing the calibration image comprising the pattern.

9. The method of claim 1, comprising, prior to printing the calibration image, superimposing the pattern on a calibration image.

10. A device comprising a storage and a processor, the storage comprising executable instructions to:
    acquire two images of a printed calibration image using two measurement devices, the measurement devices offset along an axis so that the two images correspond to two portions of the printed calibration image overlapping along the axis,
    the printed calibration image comprising a periodical pattern extending across the printed calibration image in the direction of the axis,
    the pattern defining a shape so that in each image, a portion of the pattern appears as different from a straight line parallel to the axis, and
    align the two images using the two portions of pattern, wherein the aligning includes cancelling the phase between the two portions of pattern.

11. A printer comprising a storage, a processor, and a plurality of scanners offset along an axis,
    the storage comprising executable instructions to:
    print a calibration image comprising a periodical pattern extending across the printed calibration image in the direction of the axis,
    acquire a plurality of images of the printed calibration image using the plurality of scanners, the plurality of images corresponding to a plurality of portions of the printed calibration image overlapping along the axis, the pattern defining a shape so that in each image, a portion of the pattern appears as different from a straight line parallel to the axis, align the plurality of images using the plurality of portions of pattern wherein the aligning includes cancelling the phase between the plurality of portions of pattern.

\* \* \* \* \*